United States Patent
Parfondry et al.

(10) Patent No.: US 6,617,369 B2
(45) Date of Patent: *Sep. 9, 2003

(54) PROCESS FOR MAKING VISCO-ELASTIC FOAMS, POLYOLS BLEND AND REACTION SYSTEM USEFUL THEREFOR

(75) Inventors: Alain Parfondry, Brussels (BE); Jianming Yu, Brussels (BE)

(73) Assignee: Huntsman International LLC, Salt Lake City, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/122,435

(22) Filed: Apr. 12, 2002

(65) Prior Publication Data

US 2003/0105177 A1 Jun. 5, 2003

Related U.S. Application Data

(63) Continuation of application No. PCT/EP00/09732, filed on Oct. 5, 2000.

(30) Foreign Application Priority Data

Nov. 2, 1999 (EP) .............................................. 99121695

(51) Int. Cl.$^7$ ............................................... C08G 18/14
(52) U.S. Cl. ...................... 521/174; 521/130; 521/133; 521/137; 521/160; 521/904
(58) Field of Search ................. 521/130, 133, 521/137, 160, 174, 904

(56) References Cited

U.S. PATENT DOCUMENTS

| 4,143,004 | A | | 3/1979 | Stromblad et al. | ........... 521/174 |
| 5,369,138 | A | | 11/1994 | Gansen | ........................ 521/159 |
| 5,441,993 | A | * | 8/1995 | Maretti | ........................ 521/174 |
| 5,459,170 | A | * | 10/1995 | Bleys et al. | ................. 521/125 |
| 5,521,226 | A | * | 5/1996 | Bleys | ......................... 521/174 |
| 5,594,097 | A | | 1/1997 | Chaffanjon et al. | ......... 528/419 |
| 5,840,782 | A | * | 11/1998 | Limerkens et al. | ......... 521/174 |
| 6,031,010 | A | * | 2/2000 | Lin | ............................. 521/51 |

FOREIGN PATENT DOCUMENTS

| DE | 4129666 | 3/1993 |
| GB | 1381925 | 1/1975 |

\* cited by examiner

*Primary Examiner*—John M. Cooney, Jr.
(74) *Attorney, Agent, or Firm*—Nicole Peffer

(57) ABSTRACT

The invention relates to a one-shot or prepolymer process for preparing a visco-elastic polyurethane foam by reacting a polyisocyanate composition with a polyol composition comprising b1) an EO-rich polyol; b2) a polyol with an EO content between 20–50% and a primary hydroxy content of at least 50%; b3) a polyol with an EO content between 10–20% and a primary hydroxy content of at least 50%; and b4) a polyalkyleneglycol; according to the following proportions: b1: 30–85 wt %, b2: 5–65 wt %, b3: 5–40 wt %, b4: 0–50 wt %.

The invention also relates to reaction systems comprising the above components and to the polyol composition.

13 Claims, No Drawings

PROCESS FOR MAKING VISCO-ELASTIC FOAMS, POLYOLS BLEND AND REACTION SYSTEM USEFUL THEREFOR

This application is a continuation of international application number PCT/EP00/09732, filed Oct. 5, 2000.

The instant invention relates to a process for making visco-elastic foams. It also relates to reaction systems that are useful in the said process, as well as specific polyols blends.

Visco-elastic foams are usually produced from a polyol blend comprising a rigid polyol having an OH value of 180–400. This provides drawbacks. The first problem is that this rigid polyol is usually all PO, thus with only secondary hydroxy groups, thus less reactive. The second drawback is that this rigid polyol leads to highly crosslinked foams, thus with lower mechanical properties (tear strength and elongation are quite low). The third drawback is that the flow quality is poor (due to an early network formation).

U.S. Pat. No. 4,839,397 discloses a foam with insulation properties obtained at an index below 80, which is adhesive, has a high density and a loss factor of at least 0.4. The visco-elastic adhesive foams are notably produced from a polyol blend such as 48 parts of polyol PO/EO, OH value 42, molecular weight 4000, 26 parts PPG, OH value 250, molecular weight 450 and 6 parts of polyol PO/EO, OH value 28, as a cell regulator.

U.S. Pat. No. 5,847,014 discloses a process for making a foam from a polyol blend comprising notably a standard polyol, a non-tertiary amine polyol and amine/alcohol.

WO-A-9816567 discloses a foam obtained from a polyol mixture comprising 30–70% of a polyol having a high primary hydroxy content and 70–30% of a rigid polyol having a molecular weight in the range of 300 to 1000.

The instant invention aims at solving these problems and at providing easy processable visco-elastic foams without resort to hard polyol.

The instant invention also aims at providing a flexible polyurethane foam which exhibits a low compression set, a very low resilience (good damping), a good tear strength, a very high elongation and a high loss factor.

The instant invention also aims at providing a system of wide range of processability (wide range of 2,4'/4,4' ratio for MDI), of low viscosity for the ingredient streams (which would be especially useful for making mouldings for sound insulation, and which could be used on state-of-the-art polyurethane machinery).

The invention thus provides a one-shot or prepolymer process for preparing a visco-elastic polyurethane foam at an NCO index of 70–120 by reacting:

a) a polyisocyanate composition;

b1) a polyoxyethylene-polyoxypropylene polyol, having an average nominal hydroxy functionality of 2–6, where the EO is present as tipped EO and/or random EO, the total EO content being at least 50% by weight;

b2) a polyoxyethylene-polyoxypropylene polyol, having an average nominal hydroxy functionality of 2–6, where the EO is present as tipped EO and/or random EO, the total EO content being between 20–50% by weight, having a primary hydroxy content of at least 50% calculated on the amount of primary and secondary hydroxyl groups;

b3) a polyoxyethylene-polyoxypropylene polyol, having an average nominal hydroxyl functionality of 2–6, having a primary hydroxy content of at least 50% calculated on the amount of primary and secondary hydroxyl groups, and having an EO content of from 10 to 20% by weight;

b4) a polyalkyleneglycol having an average molecular weight from 100 to 1200;

these polyols b1, b2, b3 and b4 being reacted according to the following proportions, based on the combined weights of b1, b2, b3 and b4, b1: 30–85 wt %, b2: 5–65 wt %, b3: 5–40 wt %, b4: 0–50 wt %;

c) water; and d) additives and auxiliaries known per se;

and where the polyisocyanate prepolymer has an NCO value above 20% by weight in case the prepolymer process is used.

The invention also relates to a specific polyol composition comprising the three or four above polyols according to specific ratios.

The invention also relates to a reaction system comprising A) a polyisocyanate prepolymer obtained by reacting the polyisocyanate with part of the polyol composition of the invention, and B) an isocyanate-reactive component comprising the remainder of the polyol composition of the invention and water.

In the context of the present invention the following terms, if and whenever they are used, have the following meaning:

1) isocyanate index or NCO index:
the ratio of NCO-groups over isocyanate-reactive hydrogen atoms present in a formulation, given as a percentage:

$$\frac{[NCO] \times 100(\%)}{[\text{active hydrogen}]}$$

In other words the NCO-index expresses the percentage of isocyanate actually used in a formulation with respect to the amount of isocyanate theoretically required for reacting with the amount of isocyanate-reactive hydrogen used in a formulation.

It should be observed that the isocyanate index as used herein is considered from the point of view of the actual foaming process involving the isocyanate ingredient and the isocyanate-reactive ingredients. Any isocyanate groups consumed in a preliminary step to produce modified polyisocyanates (including such isocyanate-derivatives referred to in the art as quasi or semi-prepolymers and prepolymers) or any active hydrogens reacted with isocyanate to produce modified polyols or polyamines, are not taken into account in the calculation of the isocyanate index. Only the free isocyanate groups and the free isocyanate-reactive hydrogens (including those of the water) present at the actual foaming stage are taken into account.

2) The expression "isocyanate-reactive hydrogen atoms" as used herein for the purpose of calculating the isocyanate index refers to the total of hydroxyl and amine hydrogen atoms present in the reactive compositions in the form of polyols, polyamines and/or water; this means that for the purpose of calculating the isocyanate index at the actual foaming process one hydroxyl group is considered to comprise one reactive hydrogen, one primary or secondary amine group is considered to comprise one reactive hydrogen and one water molecule is considered to comprise two active hydrogens.

3) Reaction system: a combination of components wherein the polyisocyanate component is kept in a container separate from the isocyanate-reactive components.

4) The expression "polyurethane foam" as used herein generally refers to cellular products as obtained by reacting polyisocyanates with isocyanate-reactive hydrogen containing compounds, using foaming agents, and in particular includes cellular products obtained with water as reactive foaming agent (involving a reaction of water with isocyanate groups yielding urea linkages and carbon dioxide and producing polyurea-urethane foams).

5) The term "average nominal hydroxyl functionality" is used herein to indicate the average functionality (number of hydroxyl groups per molecule) of the polyol composition on the assumption that this is the average functionality (number of active hydrogen atoms per molecule) of the initiator(s) used in their preparation although in practice it will often be somewhat less because of some terminal unsaturation. The average equivalent weight of a polyol is the average molecular weight divided by this average nominal hydroxyl functionality.

6) The term "average" is used to indicate an average by number.

7) The term "visco-elastic foams" are intended to designate those foams having a resilience of at most 40%, as measured according to ISO 8307.

The following way of describing polyols is used in the present application: A PO-EO polyol is a polyol having first a PO block attached to the initiator followed by an EO block. A PO-PO/EO polyol is a polyol having first a PO block and then a block of randomly distributed PO and EO. A PO-PO/EO-EO polyol is a polyol having first a PO block then a block of randomly distributed PO and EO and then a block of EO. A PO-EO polyol is a polyol having first a PO block and then an EO block. In the above descriptions only one tail of a polyol is described (seen from the initiator); the nominal hydroxy functionality will determine how many of such tails will be present.

The polyisocyanates used in the prepolymer may be selected from aliphatic, cycloaliphatic and araliphatic polyisocyanates, especially diisocyanates, like hexamethylene diisocyanate, isophorone diisocyanate, cyclohexane-1, 4-diisocyanate, 4,4'-dicyclohexylmethane diisocyanate and m- and p-tetramethylxylylene diisocyanate, and in particular aromatic polyisocyanates like tolylene diisocyanates (TDI), phenylene diisocyanates and most preferably methylene diphenyl isocyanates having an isocyanate functionality of at least two. Methylene diphenyl isocyanates (MDI) are preferred.

The methylene diphenyl isocyanates (MDI) may be selected from pure 4,4'-MDI, isomeric mixtures of 4,4'-MDI and 2,4'-MDI and less than 10% by weight of 2,2'-MDI, crude and polymeric MDI having isocyanate functionalities above 2, and modified variants thereof containing carbodiimide, uretonimine, isocyanurate, urethane, alophanate, urea or biuret groups. Most preferred methylene diphenyl isocyanates are pure 4,4'-MDI and isomeric mixtures of 4,4'-MDI with 2,4'-MDI, optionally containing up to 50% by weight of crude or polymeric MDI and/or uretonimine and/or carbodiimide and/or urethane modified MDI. Mixtures of these preferred methylene diphenyl isocyanates with in particular up to 25% by weight of other polyisocyanates mentioned above, especially TDI, may be used if desired.

The polyisocyanate may contain dispersed urea particles and/or urethane particles prepared in a conventional way, e.g. by adding a minor amount of an isophorone diamine to the polyisocyanate.

The prepolymer is obtained by standard methods known to the skilled man. The NCO value is at least 20%, preferably at least 23%, more preferably at least 25% by weight.

Preferred polyisocyanates used in the process comprises at least 80% by weight of 4,4'-MDI (methylene diphenyl isocyanate). The remaining part may comprise isomers thereof, higher functionalities oligomers thereof, variants thereof, or any other isocyanate (such as TDI), as disclosed above.

Polyol b1 is an EO rich polyol. It can be prepared by known methods. It comprises PO and EO, where the EO can be random, tipped, or both. Preferably the EO is random in majority. The EO content is greater than 50% by weight (over the total oxyalkylene units present).

Polyol b2 can have a structure of the type PO-PO/EO-EO or of the type PO/EO-EO or of the type PO-EO. The total EO content is from 20 to 50% by weight (over the total oxyalkylene units present), preferably from 21 to 45%. Polyol b2 has a primary OH content of at least 50%, preferably at least 70%. In the PO-PO/EO-EO type polyol, the first PO block comprises preferably from 20 to 75% by weight of the PO units. In those polyols b2) comprising both tipped and random EO, the weight ratio tipped EO/random EO preferably is from 1:3 to 3:1. The polyol having a structure of the type PO-PO/EO-EO can notably be produced according to the teaching of the Chaffanjon et al. U.S. Pat. No. 5,594,097. The polyol having a structure of the type -PO/EO-EO can notably be produced according to the teaching of Hostettler U.S. Pat. No. 4,559,366. One example of a polyol b2) is one where the tipped EO content is from 10–20% by weight.

Polyol b3 can be prepared by known methods. It has a primary hydroxy content of at least 50%, preferably at least 70%. It can be of various structures (PO-EO, PO/EO, etc.), where the EO can be either random, tipped, or both. The EO content is from 10 to 20% by weight (over the total oxyalkylene units present). A preferred polyol is one where EO is present as tipped EO.

Polyol b4 is optional and is a polyalkyleneglycol such as polyoxyethylene glycol PEG or polyoxypropylene glycol PPG. A preferred polyol is a PEG diol.

The average nominal functionality of these polyols is comprised between 2 and 6, preferably between 2 and 4.

The average equivalent weight is generally comprised between 1000 and 4000, preferably 1500 and 3500, except for polyol b4.

The polyols are caused to react in the process according to the following proportions, expressed on the basis of the combined weights of the polyols:

b1: 30–85%, preferably 40–70% by weight
b2: 5–65%, preferably 10–30% by weight
b3: 5–40%, preferably 5–25% by weight
b4: 0–50%, preferably 0–40% by weight.

Each component b1, b2, b3 and b4 may be comprised of mixtures.

Dispersed material can also be present. This is known as polymer-modified polyol, and comprise e.g. SAN or PIPA (Poly Isocyanate Poly Addition), or PHP (Polyurea Dispersion).

The polymer-modified polyols which are particularly interesting in accordance with the invention are products obtained by in situ polymerisation of styrene and/or acrylonitrile in poly(oxyethylene/oxypropylene)polyols and products obtained by in situ reaction between a polyisocyanate and an amino- or hydroxy-functional compound (such as triethanolamine) in a poly(oxyethylene/oxypropylene) polyol. The solids content (based on the total polyol weight b1+b2+b3+b4) can vary within broad limits, e.g. from 5 to 50%. Particle sizes of the dispersed polymer of less than 50 microns are preferred. Mixtures can be used as well.

The invention also relates to a specific polyol mixture, comprising the three or four polyols as defined above, according to the following proportions, expressed on the basis of the combined weights of the polyols:

b1: 30–85%, preferably 40–70% by weight
b2: 5–65%, preferably 10–30% by weight
b3: 5–40%, preferably 5–25% by weight
b4: 0–50%, preferably 0–40% by weight.

Water is used as the blowing agent. Carbon dioxide may be added if needed. It is appropriate to use from 1.0 to 10%, preferably from 1.5 to 5%, by weight of water based on the weight of the total polyol component (prereacted and not prereacted, i.e. the total starting polyol or total starting isocyanate-reactive compounds), where the water can optionally be used in conjunction with carbon dioxide.

Other conventional ingredients (additives and/or auxiliaries) may be used in making the polyurethanes. These include catalysts, for example, tertiary amines and organic tin compounds, surfactants, cross linking or chain extending agents, for example, low molecular weight compounds such as diols, triols (having a molecular weight below the one of b3/b4) and diamines, flame proofing agents, for example, halogenated alkyl phosphates, fillers and pigments. Foam stabilizers, for example polysiloxane-polyalkylene oxide block copolymers, may be used to stabilize or regulate the cells of the foam.

The amount of these minor ingredients used will depend on the nature of the product required and may be varied within limits well known to a polyurethane foam technologist.

These components, notably the polyols b1, b2, b3 and b4 can be added in any order, provided the process is one-shot or is a prepolymer process in which the prepolymer is used according to the NCO values indicated above.

The polyols can be added one after the other, or part by part, in any order (for example, part of b1, then the remainder of b1 together with the all of b2+b3+b4 or all of b2 then all of b1 then all of b3 then all of b4).

In one embodiment, the prepolymer is obtained with all the polyol b1, and no polyol b2, b3 and b4, which are thus added via the isocyanate-reactive composition.

The components of the polyurethane forming reaction mixture may be mixed together in any convenient manner, for example by using any of the mixing equipment described in the individual components may be pre-blended so as to reduce the number of component streams requiring to be brought together in the final mixing step. It is often convenient to have a two-stream system whereby one stream comprises the polyisocyanate or polyisocyanate prepolymer and the second stream comprises all the other components of the reaction mixture.

The visco-elastic foams may be made according to the moulding or the slabstock technique. The foams may be preferably prepared by known hot or cold cure moulding processes. The foams may be used in the furniture and automotive industries in seating, cushioning and mattresses, and for sound damping and insulation.

The visco-elastic foams thus obtained have a free rise density comprised between, e.g., 25 and 80 kg/m³, preferably 30 and 70 kg/m³. These foams show a resilience at most 35%, preferably at most 25%, more advantageously at most 10%.

The invention also provides a reaction system that will enable the foam producer to make the desired foam by reacting the polyisocyanate and polyol compositions. This approach provides a relatively simple way to the customer to make a product from often a variety of chemicals by combining two compositions under appropriate conditions. The polyisocyanate component is either separate or is the prepolymer (if any), while the isocyanate-reactive component comprises the remainder of the polyol. Under the prepolymer embodiment, any combination is foreseen (provided the NCO value characteristic is met). It covers notably the following possibilities: Part of b1+b2+b3+b4 in the prepolymer, then the remainder of b1+b2+b3+b4 in the isocyanate-reactive composition; Part of b1+b2 but no b3/b4, then the remainder of b1+b2 and all b3/b4; Part of b1+b3+b4 but no b2, then the remainder of b1+b3+b4 and all b2; all of b1, then the all of b2+b3+b4; all of b2, then the all of b1+b3+b4; Part of b1, then the remainder of b1 together with the all of b2+b3+b4; Part of b2, then the remainder of b2 together with the all of b1+b3+b4. In one embodiment, the reaction system comprises A) a prepolymer obtained with all the b1 polyol (provided the NCO value feature is met) and B) the remainder of the polyol and the other reactants.

The process is especially useful when the EO content, based on all polyol (prereacted or not), is higher than 40%, preferably higher than 50% by weight.

The following examples illustrate the invention without limiting same.

Unless otherwise indicated, all parts are given by weight.

| Glossary (all functionalities are nominal functionalities) | |
| --- | --- |
| Polyol A | PO/EO, with EO as random. EO content is 75% by weight. Average equivalent weight is 1336. Functionality is 3, OH value is 42 mg KOH/g. |
| Polyol B | PO-PO/EO-EO, total EO content is 28, 6% by weight. Tip EO content is 15% by weight. Average equivalent weight is 2004. Functionality is 3, OH value is 28 mg KOH/g. Primary OH content is 87%. |
| Polyol C | PO-PO/EO-EO, total EO content is 21% by weight. Tip EO content is 15% by weight. Average equivalent weight is 2004. Functionality is 3, OH value is 28 mg KOH/g. Primary OH content is 83%. |
| Polyol D | PO/EO-EO, total EO content is 29.6% by weight. Tip EO content is 15% by weight. Average equivalent weight is 2004. Functionality is 3, OH value is 28 mg KOH/g. Primary OH content is 84%. |
| Polyol E | PO-EO, with EO as tipped. EO content is 15% by weight. Average equivalent weight is 2004. Functionality is 3, OH value is 28 mg KOH/g. Primary OH content is 81% |
| Polyol F | Polymer polyol, with 20% by weight of dispersed urethane solids from triethanolamine and uretonimine modified MDI in polyol E. |
| Polyol G | PEG 200. |
| Polyol H | PEG 600. |
| Isocyanate A | Modified MDI comprising 72.8% by weight of MDI (2.0% of which is 2,4'- and 2,2') and 27.2% by weight uretonimine-modified MDI Functionality is 2.12. NCO value is 29.3% by weight. |
| Isocyanate B | Quasi-prepolymer based on MDI (81.3% by weight diisocyanate 30% of which is 2,4'-MDI and 18.7% is oligomer species of higher functionality, Functionality is 2.16.) and polyol E. NCO value is 29.7% by weight. |
| Isocyanate C | MDI comprising 78.2% by weight diisocyanate 26.0% of which is 2,4'-MDI and 21.8% is oligomer species of higher functionality. Functionality is 2.19. NCO |

Glossary
(all functionalities are nominal functionalities)

| | |
|---|---|
| | value is 32.6% by weight. |
| Isocyanate D | MDI having a 4,4' isomer content of 50% by weight. NCO value is 33.6 by weight, functionality is 2.0 |
| B4113 | Surfactant from Goldschmidt |
| D8154 | Amine catalyst from Air Products |
| Niax A1 | Catalyst from Union Carbide |
| D33LV | Catalyst from Air Products |

Foams are produced according to the following scheme. Polyols, catalysts, surfactants, water are mixed prior to the addition of isocyanates. Polyol blends and isoyanates are mixed at 20° C. during 8 seconds before foaming. Free-rise foams are made in plastic buckets of 2.5 l to 10 l.

Moulded foams are made with a square mould of 9.1 l preheated to 45° C.

The properties of the foam are determined according to the following methods and standards:

Nature of cells:

| | |
|---|---|
| Recession (%) | |
| FRD (Free Rise Density) Moulding | ISO 845 |
| OAD (OverAll Density) (kg/cm$^3$) | ISO 845 |
| CD (Core Density) (kg/cm$^3$) Foaming | |
| Cream Time (s) | |
| End Of Rise (s) | |
| Compression hardness | |
| CLD 40% (kPa) | ISO 3386-1 |
| Hysteresis Loss (%) | |
| Compression set (thickness) | ISO 1856 |
| Dry 75% (%) | |
| Humid 75% (%) | |
| Resilience (%) | ISO 8307 |
| Tear strength (N/m) | ISO 8067 |
| Max | |
| Tensile strength (kPa) | ISO 1798 |
| Elongation (%) | |
| Loss factor | DIN53576 |

The results are summarized in the following tables. Note that the loss factors of foams of examples 14, 15 and 16 are 0.62, 0.68 and 0.8 respectively.

The foams of examples 7, 8, 9, 14, 15, 23, 24 and 25 exhibit adhesive surfaces. The invention thus also provides foams with adhesive properties.

| | Examples | | | | | | | | | | |
|---|---|---|---|---|---|---|---|---|---|---|---|
| Component | 1 | 2 | 3 | 4 | 5 | 6 | 7 | 8 | 9 | 10 | 11 |
| Polyol A | 40 | 60 | 60 | 60 | 40 | 40 | 60 | 60 | 60 | 60 | 60 |
| Polyol B | 60 | 20 | 20 | 20 | 60 | 60 | 20 | 20 | 20 | 20 | 20 |
| Polyol C | | | | | | | | | | | |
| Polyol D | | | | | | | | | | | |
| Polyol E | | 20 | 20 | | | | 20 | 20 | 20 | 20 | 20 |
| Polyol F | | | | 23 | | | | | | | |
| Polyol G | | | | | | | | | | | |
| Polyol H | | | | | | | | | | | |
| Water | 6 | 4.5 | 3.5 | 5.5 | 5 | 5 | 4 | 3.5 | 3.5 | 3 | 3 |
| D 8154 | 0.5 | 0.5 | 0.5 | 0.5 | 0.5 | 0.5 | 0.5 | 0.5 | 0.5 | | |
| B 4113 | 0.3 | 0.3 | 0.3 | 0.3 | 0.3 | 0.3 | 0.3 | 0.3 | 0.3 | 0.7 | 0.7 |
| Niax A1 | 0.05 | 0.05 | 0.05 | 0.05 | 0.05 | 0.05 | 0.05 | 0.05 | 0.05 | | |
| D 33 LV | 0.1 | 0.1 | 0.1 | 0.1 | 0.1 | 0.1 | 0.1 | 0.1 | 0.1 | 0.7 | 0.7 |
| Isocyanate A | 75 | 60 | 50 | 71 | 70 | 75 | 45 | 50 | 58 | | |
| Isocyanate B | | | | | | | | | | 50 | |
| Isocyanate C | | | | | | | | | | | 50 |
| Isocyanate D | | | | | | | | 20 | | | |
| NCO index | 75 | 74 | 77 | 73 | 79 | 84 | 93 | 76.4 | 88.6 | 87 | 96 |

| | Examples | | | | | | | | | | |
|---|---|---|---|---|---|---|---|---|---|---|---|
| Component | 12 | 13 | 14 | 15 | 16 | 17 | 18 | 19 | 20 | 21 | 22 |
| Polyol A | 60 | 60 | 64 | 54 | 54 | 54 | 54 | 67 | 67 | 55 | 55 |
| Polyol B | 20 | 20 | | | | | | | | | |
| Polyol C | | | | | | | | | | 15 | 15 |
| Polyol D | | | 16 | 16 | 16 | 16 | 16 | 13 | 13 | | |
| Polyol E | 20 | 20 | | | | | | | | | |
| Polyol F | | | | | | | | | | | |
| Polyol G | | | 20 | 30 | | 30 | 30 | 20 | 20 | 30 | 30 |
| Polyol H | | | | | 30 | | | | | | |
| Water | 3.5 | 3.5 | 3 | 3 | 3 | 2.5 | 3 | 3 | 3.5 | 2 | 2 |
| D 8154 | | | | | | | | | | | |
| B 4113 | 0.7 | 0.7 | | | | | | | | | |
| Niax A1 | | | | | | | | | | | |
| D 33 LV | 0.7 | 0.7 | 0.5 | 0.5 | 0.5 | 0.5 | 0.5 | 0.5 | 0.5 | 0.5 | 0.5 |
| Isocyanate A | | | | | | | | | | | |
| Isocyanate B | 55 | | 80 | 80 | 70 | 70 | 76 | 70 | 76 | 65 | 75 |
| Isocyanate C | | 55 | | | | | | | | | |
| Isocyanate D | | | | | | | | | | | |

-continued

| NCO index | 84 | 93 | 95 | 82.5 | 102 | 80 | 80 | 84 | 84 | 86 | 92 |

| Component | \multicolumn{11}{c}{Examples} |
|---|---|---|---|---|---|---|---|---|---|---|---|
| | 23 | 24 | 25 | 26 | 27 | 28 | 29 | 30 | 31 | 32 | 33 |
| Polyol A | 60 | 60 | 60 | 85 | 70 | 55 | 40 | 85 | 70 | 55 | 40 |
| Polyol B | | | | | | | | | | | |
| Polyol C | 15 | 15 | 15 | 10 | 15 | 20 | 20 | 10 | 15 | 20 | 20 |
| Polyol D | | | | | | | | | | | |
| Polyol E | | | | 5 | 15 | 25 | 40 | 5 | 15 | 25 | 40 |
| Polyol F | | | | | | | | | | | |
| Polyol G | 20 | 20 | 20 | | | | | | | | |
| Polyol H | | | | | | | | | | | |
| Water | 3.8 | 3 | 2.3 | 2.5 | 2.5 | 2.5 | 2.5 | 2.5 | 2.5 | 2.5 | 2.5 |
| D 8154 | | | | | | | | | | | |
| B 4113 | | | | | | | | | | | |
| Niax A1 | | | | | | | | | | | |
| D 33 LV | 0.5 | 0.5 | 0.5 | 0.8 | 0.8 | 0.8 | 0.8 | 0.8 | 0.8 | 0.8 | 0.8 |
| Isocyanate A | | | | | | | | 50 | 50 | 50 | 50 |
| Isocyanate B | 80 | 70 | 60 | | | | | | | | |
| Isocyanate C | | | | 45 | 45 | 45 | 45 | | | | |
| Isocyanate D | | | | | | | | | | | |
| NCO index | 80 | 83.5 | 83 | 101 | 101 | 101 | 101 | 100 | 100 | 100 | 100 |

| Properties | \multicolumn{11}{c}{Examples} |
|---|---|---|---|---|---|---|---|---|---|---|---|
| | 1 | 2 | 3 | 4 | 5 | 6 | 7 | 8 | 9 | 10 | 11 |
| Cells | open | open | open | open | open | open | open | open | open | open | open |
| Recession % | 0 | 3 | 0 | 0 | 0 | 0 | 3 | 1 | 2 | | |
| FRD (kg/cm$^3$) | 25.3 | 35 | 39 | 35.4 | 26.2 | 26.6 | 40.2 | 41.7 | 46.4 | 37.7 | 37.4 |
| Moulding overall density (kg/m$^3$) | | | | | | | | | | | |
| Core density (kg/m$^3$) | | | | | | | | | | | |
| Foaming Cream Time (s) | | | | | | | | | | | |
| End Of Rise (s) | | | | | | | | | | 133 | 128 |
| Compression hardness CLD 40% (kpa) | | | | | | 2.5 | 3 | 3.2 | 1.9 | 3.2 | 1.02 | 1.76 |
| Hysteresis (%) | 53 | 38 | 27.2 | 44.7 | 47.4 | 50.2 | 38.1 | 23.8 | 29.4 | 30.25 | 43.45 |
| Compression set (thick) | | | | | | | | | | | |
| Dry 75% (%) | | | | | | | | | | 1.3 | 2.8 |
| Humid 75% (%) | | | | | | | | | | −2.6 | −1.3 |
| Resilience (%) | | | | | | 28.4 | 27.6 | 27.8 | 31.1 | 30.7 | 18 | 18.2 |
| Tear strength Max (N/m) | | | | | | 316.2 | 336 | | 255 | 114 | 133.2 |
| Tensile strength (kPa) | | | | | | 94.7 | 98.5 | | 89.9 | 31.2 | 39.8 |
| Elongation (%) | | | | | | 137 | 121 | | 114 | 130.3 | 119.2 |

| Properties | \multicolumn{11}{c}{Examples} |
|---|---|---|---|---|---|---|---|---|---|---|---|
| | 12 | 13 | 14 | 15 | 16 | 17 | 18 | 19 | 20 | 21 | 22 |
| Cells | open | open | open | open* | open | open | open | open | open | open | open |
| Recession % | | | | | | | | | | | |
| FRD (kg/cm$^3$) | 34.3 | 34.5 | | | | 52.2 | 44.6 | 44.1 | 37.3 | 71.8 | 65.4 |
| Moulding overall density (kg/m$^3$) | | | 47.2 | 54.4 | 58.4 | | | | | | |
| Core density (kg/m$^3$) | | | 46.0 | 53.5 | 57.6 | | | | | | |
| Foaming Cream Time (s) | | | | | | 15 | 16 | 16 | 19 | 20 | 20 |
| End Of Rise (s) | 118 | 116 | | | | 80 | 82 | 106 | 101 | 66 | 73 |
| Compression hardness CLD 40% (kPa) | 1.05 | 1.93 | | | | 1.62 | 1.32 | 1.36 | 1.37 | 2.57 | 3.97 |
| Hysteresis (%) | 40.6 | 50.9 | | | | 52.85 | 75 | 49.8 | 57.8 | 28.6 | 46.6 |
| Compression set (thick) | | | | | | | | | | | |
| Dry 75% (%) | 2.3 | 6.1 | | | | 3.1 | 17.8 | 3.6 | 6.4 | 1.6 | 0.7 |
| Humid 75% (%) | −2.1 | 0 | | | | −0.3 | 1.6 | −0.8 | −0.7 | −1.1 | −1.2 |
| Resilience (%) | 16.8 | 19.4 | | | | 2.9 | 3.5 | 4.3 | 5.4 | 2 | 3 |
| Tear strength Max (N/m) | 139.3 | 145.5 | | | | 208.6 | 223.5 | 163.9 | 204.8 | 248.7 | 403 |

-continued

| | | | | | | | | | | |
|---|---|---|---|---|---|---|---|---|---|---|
| Tensile strength (kPa) | 37 | 49.5 | | | | 41.1 | 66.2 | 48.4 | 28 | 47.17 | 105.6 |
| Elongation (%) | 136.8 | 119.2 | | | | 190 | 210 | 189 | 135 | 170 | 204 |

| | Examples | | | | | | | | | |
|---|---|---|---|---|---|---|---|---|---|---|
| Properties | 23 | 24 | 25 | 26 | 27 | 28 | 29 | 30 | 31 | 32 | 33 |
| Cells | open | open | open | open | open | open | open | open | open | open | open |
| Recession % | | | | | | | | | | | |
| FRD (kg/cm$^3$) | 32.8 | 43.4 | 55.1 | 50.6 | 45.6 | 44.6 | 39.4 | 51.8 | 48 | 48.2 | 49.6 |
| Moulding | | | | | | | | | | | |
| overall density (kg/m$^3$) | | | | | | | | | | | |
| Core density (kg/m$^3$) | | | | | | | | | | | |
| Foaming | | | | | | | | | | | |
| Cream Time (s) | 22 | 18 | 18 | 20 | 20 | 18 | 17 | 15 | 15 | 15 | 15 |
| End Of Rise (s) | 102 | 85 | 79 | 96 | 109 | 114 | 87 | 74 | 74 | 75 | 73 |
| Compression hardness | | | | | | | | | | | |
| CLD 40% (kPa) | 1.66 | 1.64 | 1.82 | 2.4 | 1.6 | 1.9 | 2.5 | 3.5 | 3.3 | 3.5 | 4.4 |
| Hysteresis (%) | 70.9 | 46.65 | 23.8 | 23.5 | 28.9 | 38.6 | 46.9 | 20.2 | 24.0 | ?? | 38.0 |
| Compression set | | | | | | | | | | | |
| (thick) | | | | | | | | | | | |
| Dry 75% (%) | 1.1 | 1 | 0.9 | | | | | | | | |
| Humid 75% (%) | −1.2 | −1.4 | −1.7 | | | | | | | | |
| Resilience (%) | 9 | 4 | 6 | 11.9 | 19.0 | 18.8 | 31.9 | 20.3 | 29.4 | 23.4 | 29.6 |
| Tear strength | | | | | | | | | | | |
| Max (N/m) | 375.8 | 263.8 | 183.1 | | | | | | | | |
| Tensile strength (kPa) | 69.0 | 44.2 | 33.8 | | | | | | | | |
| Elongation (%) | 166 | 169 | 155 | | | | | | | | |

*borderline

What is claimed is:

1. A process for preparing a visco-elastic polyurethane foam at an NCO index of 70–120, which process may be a one-shot or prepolymer process, comprising reacting:
   a) a polyisocyanate composition;
   b1) a polyoxyethylene-polyoxypropylene polyol, having an average nominal hydroxy functionality of 2–6, where the EO is present as tipped EO and/or random EO, the total EO content being at least 50% by weight;
   b2) a polyoxyethylene-polyoxypropylene polyol, having an average nominal hydroxy functionality of 2–6, where the EO is present as tipped EO and/or random EO, the total EO content being between 20–50% by weight, having a primary hydroxy content of at least 50% calculated on the amount of primary and secondary hydroxyl groups;
   b3) a polyoxyethylene-polyoxypropylene polyol, having an average nominal hydroxyl functionality of 2–6, having a primary hydroxy content of at least 50% calculated on the amount of primary and secondary hydroxyl groups, and having an EO content of from 10 to 20% by weight; and optionally
   b4) a polyalkyleneglycol having an average molecular weight from 100 to 1200;
   these polyols b1, b2, b3 and b4 being reacted according to the following proportions, based on the combined weights of b1, b2, b3 and b4, b1: 30–85 wt %, b2: 5–65 wt %, b3: 5–40 wt %, b4: 0–50 wt %;
   c) water; and
   d) additives and auxiliaries known per se;
   and where the polyisocyanate prepolymer has an NCO value above 20% in case the prepolymer process is used.

2. The process according to claim 1, wherein these polyols b1, b2, b3 and b4 are reacted according to the following proportions, based on the combined weights of b1, b2, b3 and b4: b1: 40–70 wt %, b2: 10–30 wt %, b3: 5–25 wt %, b4: 0–40 wt %.

3. The process of claim 1, wherein the polyol b2) is of the -PO-PO/EO-EO type, the -PO/EO-EO type or the -PO-EO type.

4. The process of claim 1, wherein the functionality of the polyols b1, b2 and b3 is 2–4 and wherein the polyols b1 to b4 further comprise dispersed particles and wherein the EO content of the polyol based on the combined weights of b1, b2, b3 and b4 is at least 40% by weight and wherein the polyisocyanate is MDI or a modified variant thereof.

5. The process of claim 1, wherein the NCO value is at least 23% by weight and wherein the NCO index is 70–110.

6. A polyol composition comprising:
   b1) a polyoxyethylene-polyoxypropylene polyol, having an average nominal hydroxy functionality of 2–6, where the EO is present as tipped EO and/or random EO, the total EO content being at least 50% by weight;
   b2) a polyoxyethylene-polyoxypropylene polyol, having an average nominal hydroxy functionality of 2–6, where the EO is present as tipped EO and/or random EO, the total EO content being between 20–50% by weight, having a primary hydroxy content of at least 50% calculated on the amount of primary and secondary hydroxyl groups;
   b3) a polyoxyethylene-polyoxypropylene polyol, having an average nominal hydroxyl functionality of 2–6, having a primary hydroxy content of at least 50% calculated on the amount of primary and secondary hydroxyl groups and having an EO content of from 10 to 20% by weight; and optionally
   b4) a polyalkyleneglycol having an average molecular weight from 100 to 1200; these polyols b1, b2, b3 and b4 being present according to the following proportions, based on the combined weights of b1, b2, b3 and b4, b1: 30–85 wt %, b2: 5–65 wt %, b3: 5–40 wt %, b4: 0–50 wt %.

7. The polyol composition according to claim 6, wherein these polyols b1, b2, b3 and b4 are present according to the following proportions, based on the combined weights of b1, b2, b3 and b4: b1: 40–70 wt %, b2: 10–30 wt %, b3: 5–25 w %, b4: 0–40 w %.

8. The polyol composition of claim 6, wherein the polyol b2) is of the -PO-PO/EO-EO type, the -PO/EO-EO type or the -PO-EO type.

9. The polyol composition of claim 6, wherein the EO content of the polyol based on the combined weights of b1, b2, b3 and b4 is at least 40 by weight.

10. A reaction system comprising:

A) a polyisocyanate prepolymer having an NCO value of at least 20% by weight, obtained by reacting a polyisocyanate with a polyol composition comprising:
  b1) a polyoxyethylene-polyoxypropylene polyol, having an average nominal hydroxy functionality of 2–6, where the EO is present as tipped EO and/or random EO, the total EO content being at least 50% by weight;
  b2) a polyoxyethylene-polyoxypropylene polyol, having an average nominal hydroxy functionality of 2–6, where the EO is present as tipped EO and/or random EO, the total EO content being between 20–50 % by weight, having a primary hydroxy content of at least 50% calculated on the amount of primary and secondary hydroxyl groups;
  b3) a polyoxyethylene-polyoxypropylene polyol, having an average nominal hydroxyl functionality of 2–6, having a primary hydroxy content of at least 50% calculated on the amount of primary and secondary hydroxyl groups and having an EO content of from 10 to 20% by weight; and optionally
  b4) a polyalkyleneglycol having an average molecular weight from 100 to 1200;
    wherein polyols b1, b2, b3 and b4 being present according to the following proportions, based on the combined weights of b1, b2, b3 and b4, b1: 30–85 wt %, b2: 5–65 wt %, b3: 5–40 wt %, b4: 0–50 wt %; and B) an isocyanate-reactive component comprising the polyol composition and water.

11. The reaction system of claim 10, wherein polyols b1, b2, b3 and b4 are present according to the following proportions, based on the combined weights of b1, b2, b3 and b4: b1: 40–70 wt %, b2: 10–30 wt %, b3: 5–25 w %, b4: 0–40 w %.

12. The reaction system of claim 10, wherein polyol b2 is of tho -PO-PO/EO-EO type, the -PO/EO-EO type or the -PO-EO type.

13. The reaction system of claim 10, wherein the EO content of the polyol based on the combined weights of b1, b2, b3 and b4 is at least 40 by weight.

* * * * *